United States Patent [19]

Asada et al.

[11] Patent Number: 4,743,491
[45] Date of Patent: May 10, 1988

[54] PERPENDICULAR MAGNETIC RECORDING MEDIUM AND FABRICATION METHOD THEREFOR

[75] Inventors: Seiichi Asada, Kyoto; Hiroyuki Suzuki, Kokubunji; Toshio Niihara, Hachioji; Kazuetsu Yoshida, Kodaira; Masaaki Futamoto, Kanagawa; Yukio Honda, Fuchu; Norikazu Tsumita, Higashiyamato; Kazuo Shiiki, Kanagawa, all of Japan

[73] Assignees: Hitachi, Ltd.; Hitachi Maxell, Ltd., both of Tokyo, Japan

[21] Appl. No.: 793,772

[22] Filed: Nov. 1, 1985

[30] Foreign Application Priority Data

Nov. 2, 1984 [JP] Japan .................................. 59-230226
Nov. 2, 1984 [JP] Japan .................................. 59-230227

[51] Int. Cl.$^4$ ................................................ G11B 7/24
[52] U.S. Cl. ............................... 428/213; 204/192.15; 427/127; 427/128; 427/131; 428/336; 428/457; 428/694; 428/698; 428/701; 428/702; 428/900
[58] Field of Search ............... 428/694, 698, 900, 213, 428/336, 457, 701, 702; 427/127, 128, 131; 204/192 C

[56] References Cited

U.S. PATENT DOCUMENTS

4,231,816 11/1980 Cuomo et al. ................. 428/450
4,271,232 6/1981 Heiman et al. ................. 428/900
4,673,610 6/1987 Shirabata et al. .............. 428/213

FOREIGN PATENT DOCUMENTS

228705 12/1984 Japan.
59537 4/1985 Japan.

OTHER PUBLICATIONS

PTO Translation of J6059537 of 4/5/85.
Derwent Abstract No. 85/009103/02 regarding J59207426 of 12/84.
Derwent Abstract No. 84/240742/39 regarding J59144043 of 8/17/84.
Derwent Abstract #85-76658/13 regarding J60028028 of 2/13/85.
Derwent Abstract #84-240741/39 regarding J59144041 of 8/17/84.
Derwent Abstract #84-162273/26 regarding J5908709 of 5/21/84.

Primary Examiner—George F. Lesmes
Assistant Examiner—William M. Atkinson
Attorney, Agent, or Firm—Antonelli, Terry & Wands

[57] ABSTRACT

A perpendicular magnetic recording medium according to this invention comprises an electrically conductive underlayer formed on a non-magnetic substrate, in the case where no high permeability magnetic film is deposited, and a magnetic thin film having a perpendicular magnetic anisotrophy is formed thereon. In the case of a so-called double-layer structure including a high permeablilty magnetic film, on the non-magnetic substrate are formed the high permeablilty magnetic film, an intermediate film, and a magnetic thin film one on another in this order. The nearest neighbor's distance of atoms of the underlayer and the intermediate film is not smaller than 0.25 nm (2.5 Å) and not greater than 0.32 nm (3.2 Å) and they are made of at least one selected from the group consisting of V, Ru, Zn, Os, Rh, Ir, Mo, W, Re, Pd, Pt, Nb, Ta, Sn, Al, Au, Ag, Ti, nitrides and oxides of these elements.

33 Claims, 5 Drawing Sheets

PERPENDICULAR MAGNETIC RECORDING MEDIUM AND FABRICATION METHOD THEREFOR

BACKGROUND OF THE INVENTION

This invention relates to a recording medium made of $Fe_xN$ (x=2−3) suitable to perpendicular magnetic recording used for magnetic tapes, floppy disks, etc. and a fabrication method therefor.

In this specification substances including, Cr, whose concentration is not greater than 10% in number of atoms, besides $Fe_xN$, are collectively called $Fe_xN$.

Recording density in the field of the magnetic recording has been remarkably increased. In particular, the perpendicular magnetic recording method proposed by Iwasaki et al. of Tohoku University differs from the inplane recording method used in practice at present and it is characterized in that the self-demagnetizing effect becomes smaller with increasing recording density. Therefore, attention is paid thereto as a future high density magnetic recording method and researches are effected intensively thereon.

In order to realize this perpendicular magnetic recording, perpendicularly magnetized film having an easy magnetization axis perpendicular to the surface of the magnetic film is necessary as recording medium. Further, it is thought that a so-called double-layer structure, for which a high permeability magnetic film is disposed under this perpendicularly magnetized film, is more useful in practice than a so-called single layer structure consisting only of the perpendicularly magnetized film, because reproduction output for the former obtained by means of a magnetic head is twice as high as that obtained for the latter.

As the high permeability magnetic film are used well-known high permeability magnetic material for magnetic head, such as ferrite, $Fe_{18}N_2$, Permalloy, Sendust, (Fe, Co, Ni)-(Si, B, C, P, Al-B) amorphous alloy, (Fe, CO, Ni,)-(Zr, Hf, Y, Ti, Nb, Ta, W, V, Mo, Cr) amorphous alloy, $Fe_xC$, etc. applied on a carrier. The thickness of the film is usually 0.5-2.0 μm.

As the perpendicularly magnetized film, are known alloy films of Co-Cr, Co-Cr-Rh, Co-V, Co-Ru, Co-O, Co, Co-Ni-Mn-P, etc. deposited by physical evaporation method (sputtering method, vacuum evaporation method, etc.), electroplating or chemical vapor deposition method (CVD method).

However, the main component of all of these perpendicularly magnetized films is Co, what is problematical with respect of cost and stable availability, because resources of Co are scarce. Further, for the magnetic substances whose main component is Co, there are risks of heat demagnetization and pressure demagnetization.

One of the methods for resolving these problems is to use perpendicularly magnetized films made of $Fe_xN$, whose main component is Fe instead of Co. However, magnetic characteristics of the $Fe_xN$ films obtained by this method are somewhat inferior to those of Co-Cr films, which are the representative perpendicularly magnetized film.

The reason, why $Fe_xN$ (x=2-3) films form perpendicularly magnetized films, is assumed as follows. When a cross-section of an $Fe_xN$ film prepared by the physical evaporation method is observed by means of a scanning electron microscope, a columnar structure, in which crystalline grains are grown in the direction perpendicular to the surface of the film, is found. One of the reasons why $Fe_xN$ films form perpendicularly magnetized ones is the microscopic shape anisotropy due to these columnar crystallines (anisotropy due to the shape of individual columnar crystallines). Further the second reason therefor is that the condition represented by the following formula (1) is fulfilled, which means that the magnitude of this perpendicular anisotropy (Ku) is greater than the static magnetic energy $2\pi Ms^2$ (Ms: saturation magnetization), when the magnetization is directed perpendicularly to the surface of the film.

$$Ku > 2\pi Ms^2 \qquad (1)$$

Usually, for Fe thin films, even if columnar crystallines of Fe are ideally aligned perpendicularly to the surface of the film, using the values of Ku and Ms for bulk, the values of the left and the right members of the formula (1) are about $9 \times 10^6$ erg/cc and $1.8 \times 10^7$ erg/cc, respectively, and therefore the condition represented by the formula (1) is not satisfied. Furthermore, since ideal columnar crystallines (length of longer axis/length of shorter axis is almost infinitely large) are never perfectly aligned in the direction perpendicular to the surface of the film, it is presumed that the value of the left member of the formula (1) is considerably smaller than $9 \times 10^6$ erg/cc.

It is thought that the effect obtained by adding N is to accelerate the alignment of columnar crystallines perpendicular to the surface of the film and to decrease Ms to the extent that the formula (1) is valid. It is thought also that one of the reasons why $Fe_xN$ films form perpendicularly magnetized films is that N segregates on the grain boundary of the columnar crystallines.

In this case, when $Fe_xN$ has a hexagonal crystal structure and its C-axis is oriented perpendicularly to the surface of the film, since the crystal anisotropy of the hexagonal $Fe_xN$ is added to the microscopic shape anisotropy stated above, the perpendicular magnetic anisotropy (Ku, the left member of the formula (1)) becomes larger. Consequently, even if Ms is large, the $Fe_xN$ film forms perpendicular magnetized films. However, for the $Fe_xN$ alone, no alignment of the C-axis perpendicular to the film surface has been found.

As stated above, in an $Fe_xN$ film prepared by the physical evaporation method, columnar crystallines grow in the direction perpendicular to the surface of the film and the microscopic shape anisotropy of these columnar crystallines is a main reason for the perpendicular magnetic anisotropy of the $Fe_xN$ film. However, in the $Fe_xN$ film prepared directly on a non-magnetic substrate by a direct physical evaporation method, since the growth of columnar crystallines was insufficient, Ku of the $Fe_xN$ film was small and the saturation magnetic flux density (Bs=$4\pi$Ms) of the $Fe_xN$ film for producing a perpendicular magnetized film was in a region of 0.20-0.65 Wb/m$^2$ (2000-6500 G), which is somewhat smaller than Bs of a Co-Cr film, which is a representative perpendicular magnetized film.

SUMMARY OF THE INVENTION

The object of this invention is to provide a perpendicular magnetic recording medium using an $Fe_xN$ magnetic film for perpendicular magnetic recording, which has a large domain of the saturation magnetic flux density and excellent magnetic characteristics and a fabrication method therefor.

The inventors of this invention have studied the underlayer for the $Fe_xN$ film for the purpose of improving characteristics of the $Fe_xN$ and found that the growth of columnar crystallines is accelerated by using a non-magnetic, electrically conductive film as the underlayer and as the result the upper limit of Bs for producing a perpendicularly magnetized film of $Fe_xN$ is raised to a value, which is not smaller than 0.7 $Wb/m^2$ (7000 G). Electric resistivity of the underlayer may be not greater than $1 \times 10^{-1}$ $\Omega cm$, but preferably it is not greater than $1 \times 10^{-2}$ $\Omega cm$.

Further, when an electrically conductive underlayer, whose nearest neighbor's distance of atoms (NND) in crystal structure is not smaller than 0.25 nm (2.5 Å) and not greater than 0.32 nm (3.2 Å), is used, the C-axis of the hexagonal $Fe_xN$ is aligned perpendicularly to the surface of the film and thus the crystal magnetic anisotropy is added to the microscopic shape anisotropy. Consequently, the perpendicular magnetic anisotropy (Ku) is increased and the upper limit for producing a perpendicularly magnetized film of $Fe_xN$ is raised. It is obvious that the same effect can be obtained by mixing two or more elements so that mean distance between nearest neighbor atoms is not smaller than 0.25 nm (2.5 Å) and not greater than 0.32 nm (3.2 Å).

FIG. 1 shows a graph, in which the relation between the nearest neighbor's distance of atoms of an electrically conductive film used as an underlayer and the maximum value of Bs for producing a perpendicularly magnetized film of $Fe_xN$ is plotted. A curve representing the relation obtained without electrically conductive underlayer film is also indicated for comparison. In the case where an electrically conductive film, whose nearest neighbor's distance of atoms is not greater than 0.25 nm (2.5 Å) or not smaller than 0.32 nm (3.2 Å), is used as the underlayer, the upper limit of Bs for producing a perpendicular magnetized film of $Fe_xN$ becomes somewhat greater, from 0.65 to 0.7 $Wb/m^2$ (from 6500 G to 7000 G) with respect to that obtained without underlayer. This is probably due to the fact that the perpendicular alignment of columnar crystallines stated above is ameliorated. In the case where an electrically conductive film, whose nearest neighbor's distance of atoms is not smaller than 0.25 nm (2.5 Å) and not greater than 0.32 nm (3.2 Å), is used as the underlayer, the upper limit of Bs for producing a perpendicularly magnetized film of $Fe_xN$ is increased further and in any case it is not smaller than 0.7 $Wb/m^2$ (7000 G). For nearest neighbour's distance of atoms, which are not smaller than 0.265 nm (2.65 Å) and not greater than 0.285 nm (2.85 Å), the upper limit of Bs for producing a perpendicularly magnetized film of $Fe_xN$ is increased still further and at the largest it is 0.8 $Wb/m^2$ (8000 G). It is thought that amelioration of characteristics obtained, when an underlayer, whose nearest neighbor's distance of atoms is not smaller than 0.25 nm (2.5 Å) and not greater than 0.32 nm (3.2 Å), is used, is related to the fact that the C-axis of $Fe_xN$ is aligned in the direction perpendicular to the surface of the film.

The electrically conductive film whose NND is comprised between 0.25 and 0.32 nm (2.5 and 3.2 Å) may be made of at least any one of V, Ru, Zn, Os, Rh, Ir, Mo, W, Re, Pt, Nb, Sn, Ta, Al, Au, Ag, Ti, electrically conductive nitrides and oxides of these elements. Among them, Zn, Mo, W, Nb, Ta, Al, Ti, Sn and oxides of Sn are preferable, because they are cheap. The crystal structure of thin films of these metals may be hcp, fcc, bcc, amorphous, etc., but hcp and amorphous metals are preferable.

The thickness of the electrically conductive underlayer may be not smaller than 0.01 $\mu$m and not greater than 0.2 $\mu$m, but it is preferably not smaller than 0.01 $\mu$m and not greater than 0.1 $\mu$m. The reason why the thickness is preferably not smaller than 0.01 $\mu$m and not greater than 0.2 $\mu$m is that the effect is negligible when it is not greater than 0.01 $\mu$m and that the effect is saturated, when it is not smaller than 0.2 $\mu$m. This electrically conductive layer may be a single layer, but it is not excluded that it may be a compound layer consisting of layers not less than 2.

The electrically conductive layer may be fabricated by physical evaporation method, such as sputtering, evaporation, etc., chemical vapor deposition method (CVD), electroless plating, electrodeposition method, such as plating, etc. and the method for its fabrication may be arbitrarily selected, taking the whole process into account.

Any $Fe_xN$ film may be used, if the content of N is comprised between 20 and 32 atom percent and the saturation magnetic flux density is not smaller than 0.2 $Wb/m^2$ (2000 G) and not greater than 1.0 $Wb/m^2$ (10,000 G). However, $Fe_xN$ films, whose content of N is comprised between 22 and 28 atom percent and Bs is not smaller than 0.65 $Wb/m^2$ (6500 G) and not greater than 1.0 $Wb/m^2$ (10,000 G) are preferable, because they can give large reproduction output. Further, they may contain at least one of Cr, Ni, Co, Bi, Pt group elements, Zr, Ta, Nb, Al, and W at a content not greater than 10 atom % for the purpose of increasing the anticorrosive property of the $Fe_xN$ film. Among these elements, Cr, Ni, Al and W are preferable, because they are cheap.

The $Fe_xN$ is fabricated usually by a physical evaporation method, by which it is deposited by using powder, sintered powder or bulk of one of Fe and its nitrides, such as Fe, $Fe_4N$, $Fe_3N$, $Fe_{2-3}N$ and $Fe_2N$, as starting material in an Ar stream, a mixed gas stream of Ar and $N_2$, an $N_2$ stream, or a mixed gas stream of hydrogen and one of these gases. Of course, instead of Ar mentioned above, Ne, Kr and Xe can be used.

The method, by which the above mentioned elements such as Cr is included in $Fe_xN$, comprises the preparation of starting material by mixing Cr with Fe or nitride of Fe and melting them together, or by putting chips of Cr, etc. on Fe, nitride of Fe, etc.

The thickness of the film made of $Fe_xN$ or $Fe_xN$ containing Cr, etc. is preferably comprised between 0.1 $\mu$m and 1.0 $\mu$m. The reason why this thickness domain is preferable is that when the film is thinner than 0.1 $\mu$m, it is difficult to obtain a perpendicularly magnetized film and that when it is thicker than 1.0 $\mu$m, recording by means of a head is difficult.

It is desirable to apply a bias voltage of $-50$ V to $-500$ V to the substrate during the formation of a film made of $Fe_xN$ or $Fe_xN$ containing Cr, etc., because characteristics of the magnetic film can be ameliorated in this way.

Whether the $Fe_xN$ film thus fabricated is a perpendicularly magnetized film or not can be judged by observing reproduced waveform, but a simple method for judging it is to utilize the ratio $(Br_\perp/Br_\parallel)$ of the residual magnetic flux density in the direction perpendicular to the surface of the film $(Br_\perp)$ to the in-plane residual magnetic flux density $(BR_\parallel)$. It is usually thought that when $Br_\perp/Br_\parallel$ is not smaller than 0.8, it is a perpendicularly magnetized film.

Secondly the inventors of this invention have studied an intermediate film inserted between the $Fe_xN$ film and a high permeability magnetic film for the purpose of improving characteristics of the $Fe_xN$ film, and as the result, they have found that the C-axis of the hexagonal $Fe_xN$ film is aligned perpendicularly to the surface of the film and the upper limit of Bs for producing a perpendicularly magnetized film made of $Fe_xN$ is raised by using a film made of metal nitride, metal oxide, etc. as the intermediate film, whose electric resistivity is not greater than $1 \times 10^{-1}$ $\Omega$cm and whose mean nearest neighbor's distance of atoms is not smaller than 0.25 nm (2.5 Å) and not greater than 0.32 nm (3.2 Å). It is thought that this is due to the fact that the crystal anisotropy is added to the microscopic form anisotropy and thus the perpendicular magnetic anisotropy is increased.

FIG. 2 shows a graph, in which the relation between the nearest neighbor's distance of atoms of an intermediate film and the maximum value of Bs for producing a perpendicular magnetic film of $Fe_xN$ is plotted. As it can be seen in FIG. 2, when an intermediate film, whose mean nearest neighbor's distance of atoms (NND) is not smaller than 0.25 nm (0.25 Å) and not greater than 0.32 nm (0.32 Å), is used, the upper limit of Bs for producing a perpendicular magnetic film of $Fe_xN$ becomes not smaller than 0.7 $Wb/m^2$ (7000 G). $Fe_xN$ films thus obtained have been studied by the X-ray diffraction and it has been found that the C-axis of the $Fe_xN$ films are aligned perpendicularly to the surface of the film. It is thought that this C-axis alignment is one of the reasons why the upper limit of Bs of the perpendicularly magnetized films made of $Fe_xN$ has been increased.

Just as for the underlayer, for distances between nearest neighbour atoms which are not smaller than 0.265 nm (2.65 Å) and not greater than 0.285 nm (2.85 Å), the upper limit of Bs for producing a perpendicular magnetic film of $Fe_xN$ is increased specifically and at the largest it is not smaller than 0.8 $Wb/m^2$ (8000 G).

Further, the films whose NND is comprised between 0.25 nm (2.5 Å) and 0.32 nm (3.2 Å) are made of at least any one of V, Ru, Zn, Os, Rh, Ir, Mo, W, Re, Pt, Nb, Sn, Ta, Al, Au, Ag, Ti, nitrides or oxides of these elements, etc. Among them Zn, Mo, W, Nb, Ta, Al, Ti, Sn and Sn oxides are preferable, because they are cheap.

It is obvious that the same effect can be obtained by mixing two or more elements so that the mean nearest neighbor's distance of atoms is not smaller than 0.25 nm (2.5 Å) and not greater than 0.32 nm (3.2 Å). It is preferable that the intermediate film be a high permeability film. The crystal structure of these metals, metal oxides, metal nitrides, etc. may be hcp (hexagonal close packed), fcc (face centered cubic), bcc (body centered cubic), amorphous, etc., but hcp and amorphous films are preferable.

The thickness of the intermediate film is preferably not smaller than 0.01 $\mu$m and not greater than 0.1 $\mu$m, but it is more preferably not smaller than 0.01 $\mu$m and not greater than 0.05 $\mu$m. The preferable film thickness between 0.01 $\mu$m and 0.1 $\mu$m comes from the fact that the effect of the intermediate film is small when the film is thinner than 0.01 $\mu$m, and that magnetic interaction between the high permeability magnetic film and the perpendicularly magnetized film of $Fe_xN$ is small so that reproduction output is reduced during magnetic reproduction by means of a magnetic head when it is thicker than 0.1 $\mu$m. However, it is not excluded that the film consists of two layers so that the total thickness is comprised between 0.01 $\mu$m and 0.1 $\mu$m.

The intermediate film is fabricated, just as for the underlayer, by physical evaporation method (sputtering, evaporation, etc.), chemical vapor deposition method (CVD method), electrodeposition method such as plating, electroless plating method, etc. The method for its fabrication may be arbitrarily selected, taking the whole process into account.

DESCRIPTION OF THE PREFERRED EMBODIMENTS

Hereinbelow some embodiments of this invention will be explained.

EMBODIMENT 1

Figure 3:
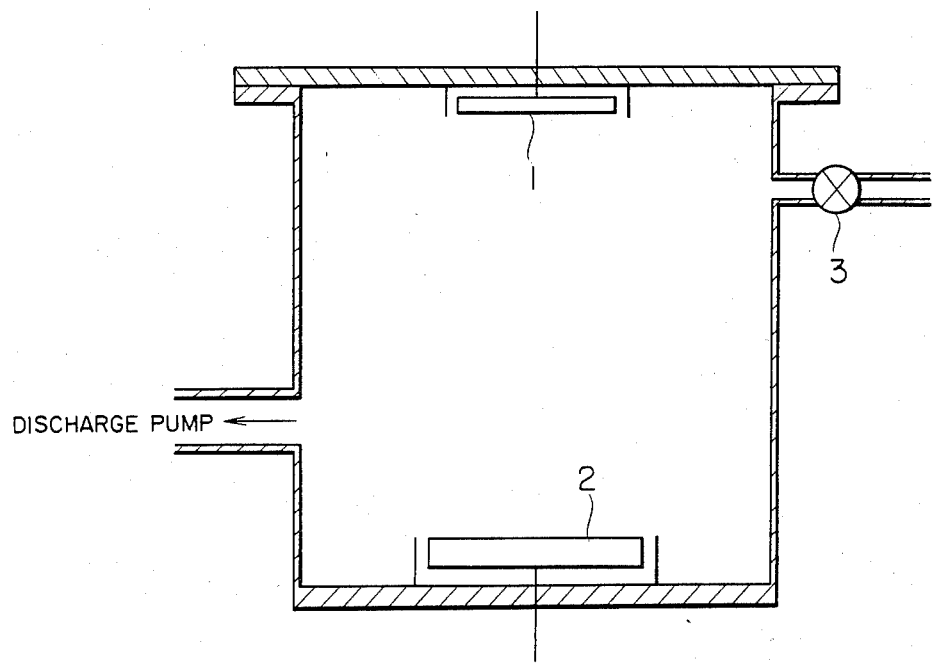
FIG. 3 is a scheme illustrating an RF sputtering device used for fabricating the perpendicular magnetic recording medium according to this invention.
Figure 4:
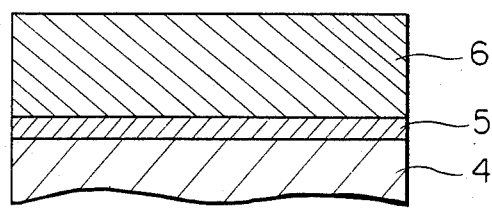
FIG. 4 is a cross-sectional view of a perpendicular magnetic recording medium having an underlayer according to an embodiment of this invention.

By means of an RF sputtering device indicated in FIG. 3, various underlayers were deposited on non-magnetic substrates and $Fe_xN$ films were formed by sputtering on these underlayers. In FIG. 3 the non-magnetic substrate 1 can be applied with a bias voltage of $-500$ V to 0 V with respect to the earth potential. A sputter target 2 has such a structure that an RF voltage of 13.5 MHz can be applied thereto. Further, the device is so constructed that two targets can be mounted so that the underlayer and the $Fe_xN$ film can be formed by sputtering one after another. Mixing ratio of Ar, $N_2$, $H_2$ can be regulated by means of a needle valve 3.

A perpendicular magnetic recording medium is fabricated by using the sputtering device described above. At first an underlayer 5 about 0.05 $\mu$m which was deposited on an optically polished glass substrate 4 in an Ar atmosphere of 0.67 Pa ($5 \times 10^{-3}$ Torr) by using a metal target. Then, an iron nitride film 6 about 0.3 $\mu$m thick was deposited on the underlayer 5 thus formed in an Ar atmosphere of 1.33 Pa ($10 \times 10^{-3}$ Torr) [containing a small amount of $N_2$ (0–5 vol %)] by using a target of 100 mm$\phi$ made of pressed powder $Fe_3N$. During the formation of the iron nitride film 6 a bias voltage of $-150$ V with respect to the earth potential was applied thereto.

The final pressure of the chamber before deposition was $1.33 \times 10^{-4}$ Pa ($1 \times 10^{-6}$ Torr) both for the underlayer 5 and for the iron nitride film 6.

Figure 1:
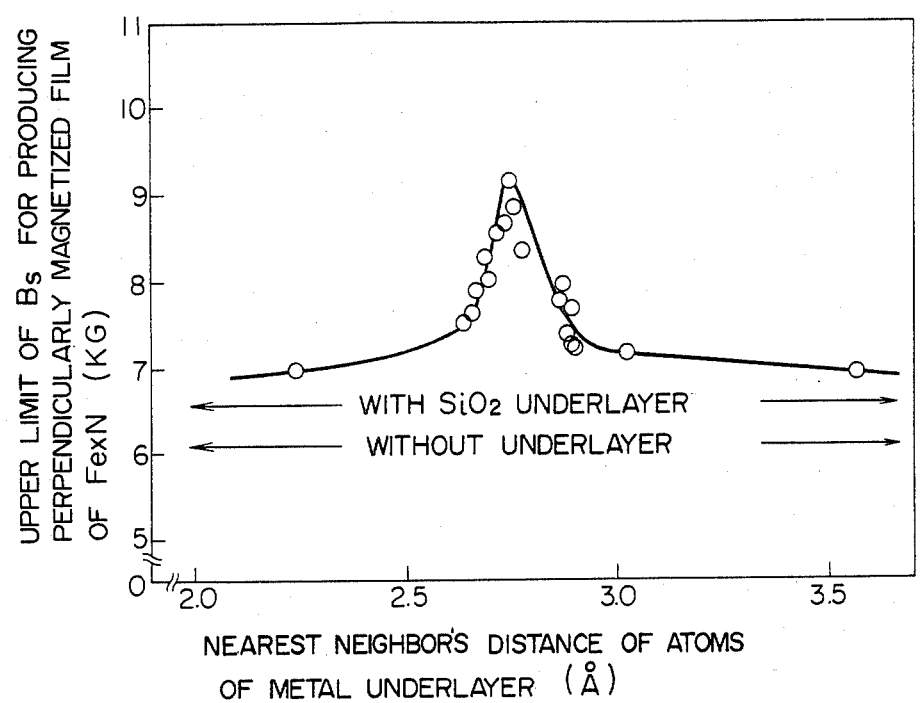
FIG. 1 is a scheme for explaining the relation between the nearest neighbor's distance of atoms of the undelayer and the maximum value of Bs for producing a perpendicularly magnetized film of $Fe_xN$ according to an embodiment of this invention.

The underlayer 5 was made of one of Mn (nearest neighbor's distance of atoms: 0.224 nm (2.24 Å)), V (2.63 Å), Ru (2.65 Å), Os (2.68 Å), Rh (2.69 Å), Ir (2.71 Å), Mo (2.73 Å), W (2.74 Å), Re (2.74 Å), Pd (2.75 Å), Pt (2.78 Å), Nb (2.86 Å), Ta (2.86 Å), Al (2.86 Å), Au (2.88 Å), Ag (2.89 Å), Ti (2.89 Å), Sn (3.01 Å), and Gd (3.56 Å). FIG. 1 shows the relation between the nearest neighbor's distance of atoms and the maximum value of Bs for producing a perpendicularly magnetized film of $Fe_xN$. The maximum value of Bs was obtained from Bs of the film whose ratio $Br_\perp/Br_\parallel$ of the film is not smaller than 0.8, by varying x of $Fe_xN$ between 2 and 3. FIG. 1 shows the relation without underlayer and that obtained with an underlayer of $SiO_2$.

As it can be seen from FIG. 1, when an electrically conductive underlayer (electric resistivity $< 1 \times 10^{-2}$ $\Omega$cm) is used, the upper limit of Bs for producing a perpendicularly magnetized film of $Fe_xN$ is not smaller than that obtained without electrically conductive underlayer or with a non-conductive underlayer. In addition, when an underlayer, whose nearest neighbor's distance of atoms (NND) is not smaller than 0.25 nm (2.5 Å) and not greater than 0.32 nm (3.2 Å), is used, Bs for producing a perpendicular magnetized film of $Fe_xN$ becomes further greater, and an underlayer, whose NND is not smaller than 0.265 nm (2.65 Å) and not greater than 0.285 nm (2.85 Å), gives Bs still further greater. It is thought that an $Fe_xN$ having a so large Bs is advantageous as a perpendicularly magnetized recording medium, because it is possible to obtain a high reproduction output of signals therewith.

TABLE 1 shows magnetic characteristics of a recording medium without electrically conductive underlayer and those prepared with an underlayer made of Re, W and Ti, respectively. As it is clear from TABLE 1, although the $Fe_xN$ film prepared on the electrically conductive underlayer has a large Bs, its $Br_\perp/Br_\parallel$ is not smaller than 0.8 and therefore it is a perpendicularly magnetized film. Slight increase of $Hc_\perp$ is observed. It is assumed that this is due to the growth of columnar crystallines in the direction perpendicular to the surface of the film and to the alignment of the C-axis of the hexagonal $Fe_xN$ film in the direction of the columnar crystallines.

TABLE 1

| NO. | UNDERLAYER | NEAREST NEIGHBOR'S DISTANCE OF ATOMS OF UNDERLAYER (Å) | Bs (G) | Hc⊥ (Oe) | Hc (Oe) | Br⊥/Bs | Br /Bs |
| --- | --- | --- | --- | --- | --- | --- | --- |
| 1 | — | — | 6400 | 300 | 200 | 0.10 | 0.08 |
| 2 | Re | 2.74 | 9100 | 600 | 150 | 0.10 | 0.08 |
| 3 | W | 2.74 | 8700 | 550 | 150 | 0.08 | 0.07 |
| 4 | Ti | 2.89 | 7600 | 510 | 170 | 0.10 | 0.07 |

Hc⊥: Perpendicular coercive force, Hc : In-plane coercive force, Br⊥/Bs: Perpendicular squareness ratio, Br /Bs: In-Plane squareness ratio

EMBODIMENT 2

TABLE 2 shows results obtained in the case where the underlayer is made of electrically conductive metal oxide ($SnO_2$) or nitride (TiN) and an $Fe_xN$ film is formed thereon in the same way as for Embodiment 1. TiN was deposited by sputtering method and $SnO_2$ by CVD method

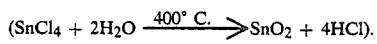

$$(SnCl_4 + 2H_2O \xrightarrow{400° C.} SnO_2 + 4HCl).$$

As it is seen from TABLE 2, Bs for producing a perpendicularly magnetized film of $Fe_xN$, in the case where the underlayer is made of electrically conductive oxide or nitride, is increased with respect to that obtained without underlayer.

TABLE 2

| NO. | UNDER-LAYER | ELECTRIC RESISTIVITY ($\Omega$ · cm) | Bs (G) | Hc⊥ (Oe) | Hc (Oe) | Br⊥/Bs | Br /Bs |
| --- | --- | --- | --- | --- | --- | --- | --- |
| 1 | — | $>10^{10}$ | 6400 | 300 | 200 | 0.10 | 0.08 |
| 2 | $SnO_2$ | $1 \times 10^{-2}$ | 7100 | 400 | 170 | 0.12 | 0.08 |
| 3 | TiN | $<10^{-4}$ | 7300 | 390 | 180 | 0.11 | 0.08 |

EMBODIMENT 3

TABLE 3 shows results obtained in the case where the underlayer is made of W, whose thickness is not smaller than 0.05 μm and not greater than 0.1 μm, and an $Fe_xN$ film containing Cr at a content of 5 atom % is formed on this underlayer while varying the bias voltage during the deposition of the $Fe_xN$ film containing Cr. In TABLE 3 Bs is kept almost constant. As it is seen from TABLE 3, $Hc_{195}$ and $Br_{195}/Bs$ are increased and $Br_\parallel/Bs$ is reduced by applying a bias voltage comprised between $-500$ V and $-50$ V with respect to the earth potential during the deposition of the $Fe_xN$ containing Cr on the electrically conductive underlayer. It is believed that these properties are advantageous to improve recording frequency characteristics, when the $Fe_xN$ film is used as a perpendicular recording medium.

TABLE 3

| NO. | THICKNESS OF W UNDERLAYER (μm) | BIAS VOLTAGE (V) | Bs (G) | Hc⊥ (Oe) | Hc (Oe) | Br⊥/Bs | Br /Bs |
| --- | --- | --- | --- | --- | --- | --- | --- |
| 1 | 0.01 | 0 | 6800 | 400 | 150 | 0.10 | 0.08 |
| 2 | 0.2 | −50 | 6900 | 600 | 180 | 0.18 | 0.04 |
| 3 | 0.15 | −100 | 6700 | 580 | 100 | 0.17 | 0.05 |
| 4 | 0.05 | −150 | 6700 | 590 | 150 | 0.19 | 0.05 |
| 5 | 0.03 | −200 | 7000 | 620 | 110 | 0.23 | 0.06 |
| 6 | 0.02 | −300 | 6800 | 550 | 130 | 0.19 | 0.06 |
| 7 | 0.18 | −500 | 7000 | 610 | 150 | 0.21 | 0.05 |

EMBODIMENT 4

An Mo film 0.05 μm thick was used as the underlayer. The magnetic thin film was an $Fe_xN$ film containing Ru at a content of 10 atom %, whose thickness was not smaller than 0.05 μm and not greater than 2.0 μm. The $Fe_xN$ film containing Ru was formed in the same way as for Embodiment 1, except that Ar gas containing $H_2$ of 10 vol. % and $N_2$ of 3 vol % was used as sputtering gas. Results thus obtained are shown in TABLE 4. As it is seen from TABLE 4, it is possible to obtain perpendicularly magnetized films of $Fe_xN$ containing Ru ($Br_\perp/Br_\parallel > 0.8$) by forming them so that their thickness is not smaller than 0.1 μm and not greater than 2.0 μm. In this way the perpendicularly magnetized film can be obtained by using a thickness of the film made of $Fe_xN$ containing Ru not smaller than 0.1 μm, but since recording by means of a head is difficult for thicknesses of the perpendicularly magnetized film not smaller than 1.0 μm, the film thickness should be preferably not smaller than 0.1 μm and not greater than 1.0 μm.

TABLE 4

| No. | FILM THICKNESS OF $Fe_xN$ CONTAINING Ru | Bs (G) | $Hc_\perp$ (Oe) | Hc (Oe) | $Br_\perp/Bs$ | Br /Bs |
|---|---|---|---|---|---|---|
| 1 | 0.05 | 4800 | 250 | 200 | 0.05 | 0.10 |
| 2 | 0.1 | 4700 | 560 | 180 | 0.10 | 0.08 |
| 3 | 0.2 | 4900 | 600 | 160 | 0.15 | 0.06 |
| 4 | 0.5 | 4800 | 620 | 180 | 0.18 | 0.07 |
| 5 | 1.0 | 4900 | 630 | 160 | 0.19 | 0.06 |
| 6 | 2.0 | 5000 | 640 | 180 | 0.20 | 0.05 |

As explained in the preceding Embodiments, it is clear that the upper limit of Bs for producing a perpendicularly magnetized film of $Fe_xN$ formed on an underlayer is increased and the properties of the perpendicularly magnetized film for a predetermined Bs are ameliorated, by using an electrically conductive underlayer made of metal, metal nitride, or metal oxide. Further, it is clear that the effect of the underlayer on the properties of the $Fe_xN$ film is remarkable, when the nearest neighbor's distance of atoms of the underlayer is not smaller than 0.25 nm (2.5 Å) and not greater than 0.32 nm (3.2 Å).

Although the underlayers and the $Fe_xN$ films were formed principally by sputtering in the preceding embodiments, they can be formed also by evaporation, CVD or ion beam sputtering method, depending on the purpose.

Furthermore, although only embodiments, for which a single underlayer was used, are shown, the underlayer can consist of two layers, depending on the purpose.

Apart from the glass substrate used in the embodiments of this invention, organic polymer such as polyesters, polyimides, etc., plate or thin band made of metal such as Al can be used as the substrate, on which the magnetic thin film is formed. Further, the substrate may be usually rectangular or circular, but it may be arbitrarily shaped, if necessary.

In addition, for items which have not been specially described in this specification (intermediate layer for the purpose of increasing adhesion between the films and the substrate and between the various films, inorganic or organic protection films for improving durability, etc.), knowledges which are already known can be applied.

Next, the formation of an intermediate film will be explained in detail in other embodiments of this invention.

EMBODIMENT 5

Permalloy (a high permeability magnetic film) was deposited on a non-magnetic substrate and an $Fe_xN$ film was formed thereon by sputtering through the layer of an intermediate film by using an RF sputtering device illustrated in FIG. 3. In addition, the films were formed except for Permalloy on monitors for measurements of magnetic properties by using a shutter mounted on the RF sputtering device.

Figure 5:
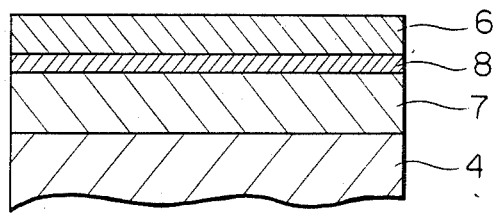
FIG. 5 is a cross-sectional view of a perpendicular magnetic recording medium having an intermediate film according to an embodiment of this invention.

By using the device described above, a perpendicular magnetic recording medium illustrated in FIG. 5 was fabricated. At first, a Permalloy film 7 about 1.0 μm thick was deposited on a glass substrate 4 optically polished in an Ar atmosphere of 0.67 Pa ($5 \times 10^{-3}$ Torr) by using a target of 100 mmφ and then a metal intermediate film 8 0.05 μm thick was formed thereon. Thereafter, an iron nitride film 6 about 0.4 μm thick was formed on the intermediate film 8 in an Ar atmosphere (containing a small amount of $N_2$ (0-5 vol %) of 1.33 Pa ($10 \times 10^{-3}$ Torr) by using a target of 100 mmφ made of $Fe_3N$ pressed powder. A bias voltage of $-150$ V with respect to the earth potential was applied to the substrate 4 during the deposition of the iron nitride film 6.

The final vacuum before deposition was $1.33 \times 10^{-4}$ Pa ($1 \times 10^{-6}$ Torr) for all the Permalloy 7, the intermediate film 8 and the iron nitride film 6.

Figure 2:
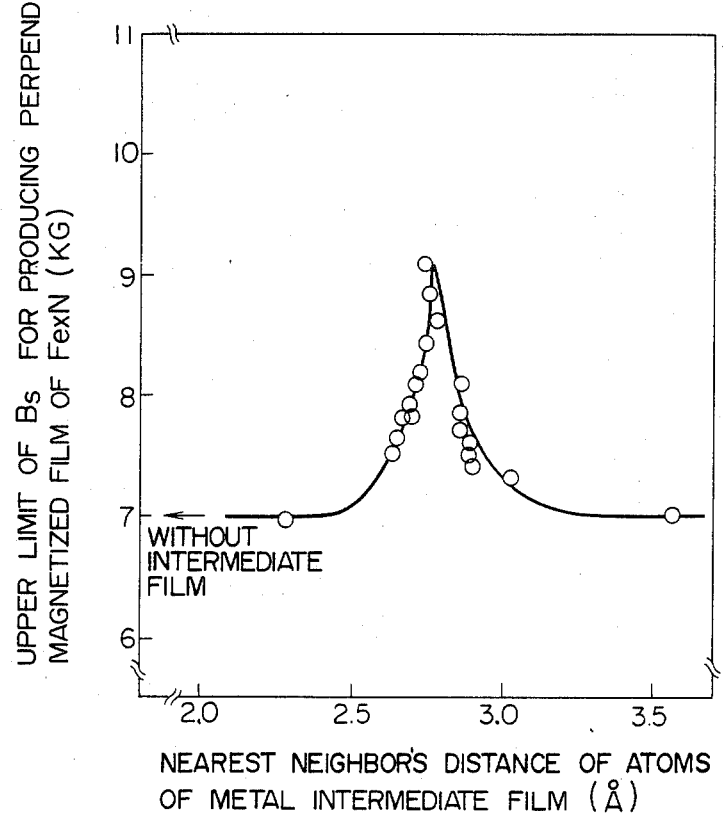
FIG. 2 is a scheme for explaining the relation between the nearest neighbor's distance of atoms of the intermediate film and the upper limit of Bs for producing a perpendicularly magnetized film of $Fe_xN$ according to an embodiment of this invention.

The intermediate film 8 was made of one of Mn (nearest neighbor's distance of atoms: 0.224 nm (2.24 Å)), V (2.63 Å), Ru (2.65 Å), Os (2.68 Å), Rh (2.69 Å), Ir (2.71 Å), Mo (2.73 Å), W (2.74 Å), Re (2.74 Å), Pd (2.75 Å), Pt (2.78 Å), Nb (2.86 Å), Ta (2.86 Å), Al (2.86 Å), Au (2.88 Å), Ag (2.89 Å), Ti (2.89 Å), Sn (3.01 Å), and Gd (3.56 Å). FIG. 2 shows the relation between the nearest neighbor's distance of atoms (NND) and the upper limit of Bs for producing a magnetic film of $Fe_xN$. The upper limit of Bs was obtained from Bs for which $Br_\perp/Br_\parallel$ of the film is not smaller than 0.8, by varying x of $Fe_xN$ between 2 and 3.

As it can be seen from FIG. 2, when an intermediate film, whose NND is not smaller than 0.25 nm (2.5 Å) and not greater than 0.32 nm (3.2 Å), is used, Bs for producing a perpendicular magnetized film of $Fe_xN$ increased rapidly. It is thought that an $Fe_xN$ having a so large Bs is advantageous as perpendicular magnetic recording medium, because it is possible to obtain a high reproduction output of signals therewith. When the intermeidate film has a NND not smaller than 0.265 nm (2.65 Å) and not greater than 0.285 nm (2.85 Å) the said Bs will be increased further.

TABLE 5 shows magnetic characteristics of a recording medium without intermediate film (in this case, a very thin (0.05 μm) Permalloy film was deposited and characteristics of an $Fe_xN$ film alone were evaluated on the basis of mixed B-H characteristics of the Permalloy film and the $Fe_xN$ film) and those prepared with an intermediate film made of Re, W and Ti, respectively. As it is clear from TABLE 5, although the recording medium deposited on the intermediate film 6 has a large Bs, its $Br_{195}/Br_\parallel$ [$(Br_\perp/Bs)/(Br_\parallel/Bs)$] is not smaller than 0.8 and therefore it is a perpendicularly magnetized film. Slight increase of $Hc_\perp$ is observed. It is assumed that this is related to the alignment of the C-axis of the $Fe_xN$ film in the direction perpendicular to the surface of the film.

TABLE 5

| NO. | INTERMEDIATE FILM | NEAREST NEIGHBOR'S DISTANCE OF ATOMS (Å) | Bs (G) | $Hc_\perp$ (Oe) | Hc (Oe) | $Br_\perp/Bs$ | Br /Bs |
|---|---|---|---|---|---|---|---|
| 1 | — | — | 6950 | 450 | 180 | 0.10 | 0.09 |
| 2 | Re | 2.74 | 9100 | 600 | 150 | 0.11 | 0.08 |
| 3 | W | 2.74 | 8800 | 560 | 150 | 0.09 | 0.08 |
| 4 | Ti | 2.89 | 7500 | 510 | 170 | 0.10 | 0.09 |

EMBODIMENT 6

TABLE 6 shows results obtained in the case where the intermediate film 8 is made of $SnO_2$ (NND: 0.319 nm (3.19 Å)) or TiN (NND: 0.303 nm (3.03 Å)) and an $Fe_xN$ film is formed thereon in the same way as for Embodiment 5.

TABLE 6

| NO. | INTER-MEDI-ATE FILM | NEAREST NEIGHBOR'S DISTANCE OF ATOMS (Å) | Bs (G) | $Hc_\perp$ (Oe) | $Hc_\parallel$ (Oe) | $Br_\perp/Bs$ | $Br_\parallel/Bs$ |
|---|---|---|---|---|---|---|---|
| 1 | — | — | 6950 | 450 | 180 | 0.10 | 0.09 |
| 2 | $SnO_2$ | 3.19 | 7150 | 500 | 170 | 0.09 | 0.08 |
| 3 | TiN | 3.03 | 7400 | 490 | 180 | 0.09 | 0.07 |

As it is seen from TABLE 6, the upper limit of Bs for producing a perpendicularly magnetized film of $Fe_xN$, in the case where the intermediate layer is made of oxide or nitride, whose NND is not smaller than 0.25 nm (2.5 Å) and not greater than 0.36 nm (3.2 Å), is increased with respect to that obtained without intermediate layer.

EMBODIMENT 7

Figure 6:
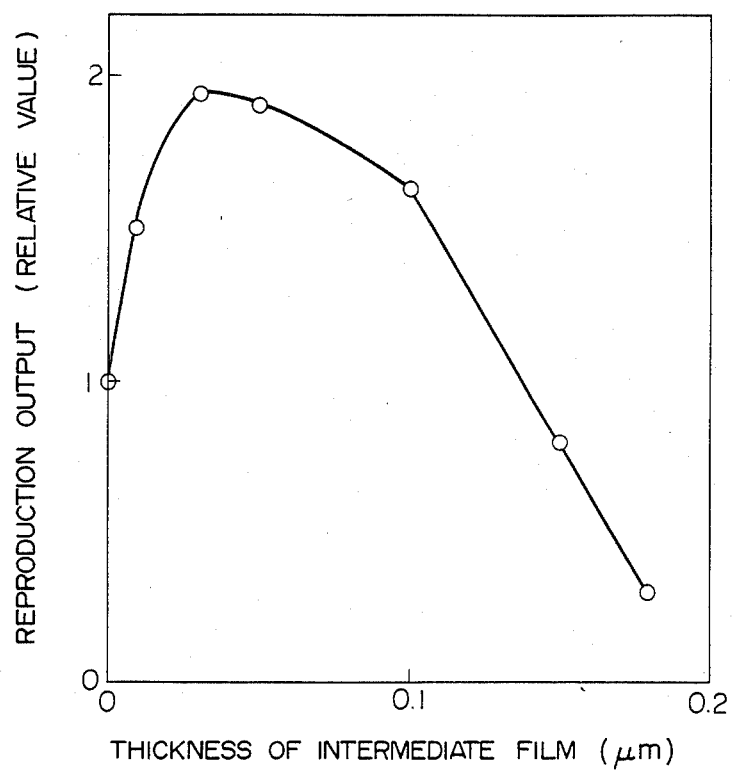
FIG. 6 is a graph indicating the relation between the reproduction output and the thickness of the intermediate film.

An $Fe_xN$ film containing Cr at a content of 5 atom % was formed on an intermediate film made of Re, whose thickness was more than 0 μm and not greater than 0.18 μm, in the same way as for Embodiment 5, Reproduction output of this perpendicular recording medium was evaluated. The high permeability magnetic film was $Co_{80}Zr_{9.5}Mo_{10.5}$ 1.0 μm thick. FIG. 6 shows the relation between the thickness of the intermediate film and the reproduction output of the magnetic head. This result was obtained by using a single magnetic pole type head, in which the thickness of the main magnetic pole was 0.3 μm, and a recording current, which was measured at a relative speed of 2.5 m/s, was so selected that the output was maximum at a recording density of 1 KFCI. As it can be seen from FIG. 6, when the thickness of the intermediate film increases from 0 to 0.01 μm, reproduction output increases rapidly and becomes maximum in the neighborhood of 0.03 μm. Then it decreases slowly with further increasing thickness. For film thicknesses not smaller than 0.1 μm the reproduction output decreases rapidly with increasing film thickness. On the basis of this result it can be understood that the thickness of the intermediate film is preferably not smaller than 0.01 μm and not greater than 0.1 μm.

EMBODIMENT 8

An $Fe_xN$ film containing Ru at a content of 10 atom % was formed on an intermediate film made of Mo, whose thickness was 0.05 μm, in the same way as for Embodiment 5. A bias voltage comprises between −500 V and 0 V with respect to the earth potential was applied to the substrate during the formation of the $Fe_xN$. TABLE 7 shows results thus obtained. As it can be seen from TABLE 7, when a bias voltage comprised between −500 V and −50 V is applied to the substrate, on which the $Fe_xN$ film is deposited, $Hc_\perp$ and $Br_\perp/Bs$ of the $Fe_xN$ film are increased and its $Br_\parallel/Bs$ decreases slightly. It is believed that these are advantageous for improving frequency characteristics, when the $Fe_xN$ film is used as perpendicular magnetic recording medium.

TABLE 7

| NO. | BIAS VOLTAGE (V) | Bs (G) | $Hc_\perp$ (Oe) | $Hc_\parallel$ (Oe) | $Br_\perp/Bs$ | $Br_\parallel/Bs$ |
|---|---|---|---|---|---|---|
| 1 | 0 | 6800 | 400 | 200 | 0.10 | 0.08 |
| 2 | −50 | 6900 | 600 | 170 | 0.17 | 0.05 |
| 3 | −100 | 6700 | 590 | 150 | 0.18 | 0.06 |
| 4 | −150 | 6700 | 620 | 180 | 0.17 | 0.05 |
| 5 | −200 | 7000 | 650 | 160 | 0.19 | 0.06 |
| 6 | −300 | 6800 | 580 | 130 | 0.16 | 0.05 |
| 7 | −500 | 7000 | 610 | 150 | 0.15 | 0.06 |

As explained in the preceding Embodiments, it is clear the upper limit of Bs for producing a perpendicularly magnetized film of $Fe_xN$ formed on an intermediate film is increased and the properties of the perpendicularly magnetized film for a predetermined Bs are ameliorated, by using an intermediate film made of metal, metal nitride or metal oxide, whose mean nearest neighbor's distance of atoms is not smaller than 0.25 nm (2.5 Å) and not greater than 0.32 nm (3.2 Å). It is also clear, as judged from the reproduction output, that the thickness of this intermediate film is preferably not smaller than 0.01 μm and not greater than 0.1 μm.

Although the high permeability films 7, the intermediate films 8 and the $Fe_xN$ films 6 were formed by RF sputtering in the preceding embodiments, they can be formed also by evaporation, magnetron sputtering, ion beam sputtering, CVD method or electrodeposition method, depending on the purpose.

Furthermore, although only embodiments for which a single intermediate layer was used are shown, the intermediate layer can consist of two layers, depending on the purpose.

Apart from the glass substrate used in the embodiments of this invention, organic polymer, such as polyesters, polyimides, etc. plate or thin band made of metal such as Al can be used as the substrate on which the magnetic thin film is formed. Further, the substrate may be usually rectangular or circular, but it may be aribitrarily shaped, if necessary.

In addition, for items which have not been specially described in this specification (intermediate layer for the purpose of increasing adhesion between the films and the substrate and between the various films, inorganic or organic protection films for improving durability, etc), knowledges which are already known can be applied.

As it is clear from the above explanation, this invention is advantageous in practice, owing to the fact that the domain of Bs for producing a perpendicularly magnetized film of $Fe_xN$ (that is, domain of x in $Fe_xN$) is enlarged by using the intermediate film according to this invention.

We claim:

1. A method for fabricating a perpendicular magnetic recording medium in which a magnetic thin film whose main component is iron nitride having perpendicular magnetic anisotropy, a nitrogen content of 20 to 32 atom % and a saturation flux density of 0.2 Wb/m² to 1.0 Wb/m² is formed on an electrically conductive underlayer deposited on a non-magnetic substrate by physical evaporation in an Ar stream, a stream of mixed gas of Ar and nitrogen, a nitrogen stream, or a stream of mixed gas of hydrogen and one of said gases, by using iron or iron nitride as starting material, said electrically conductive layer having a thickness of at least 0.01 μm, an electrical resistivity not greater than $1 \times 10^{-1}$ Ωcm and in which the distance between nearest neighbor atoms is 0.25 nm to 0.32 nm.

2. A method for fabricating a perpendicular magnetic recording medium according to claim 1, in which a bias voltage comprised between −50 V and −500 V with respect to the earth potential is applied to the substrate over which the magnetic thin film is deposited by physical evaporation.

3. A method for fabricating a perpendicular magnetic recording medium in which a magnetic film whose main component is iron nitride having perpendicular magnetic anisotropy, a nitrogen content of 20 to 32 atom % and a saturation flux density of 0.2 Wb/m$^2$ to 1.0 Wb/m$^2$ is formed on an intermediate layer which is formed on a high permeability magnetic film disposed on a non-magnetic substrate, said intermediate film having an electrical resistivity not greater than $1 \times 10^{-1}$ Ωcm and in which the distance between nearest neighbor atoms is 0.25 nm to 0.32 nm, said magnetic thin film being formed by physical evaporation in a Ar stream, a stream of mixed gas of Ar and nitrogen, a nitrogen stream, or a stream of mixed gas of hydrogen and one of said gases, by using iron or iron nitride as starting material.

4. A method for fabricating a perpendicular magnetic recording medium according to claim 3, in which a biased voltage comprised between −50 V and −500 V with respect to the earth potential is applied to the substrate over which the magnetic thin film is deposited by physical evaporation.

5. A perpendicular magnetic recording medium comprising:
   a non-magnetic substrate;
   an electrically conductive underlayer deposited on said non-magnetic substrate, said electrically conductive underlayer having a thickness of at least 0.01 μm, an electrical resistivity not greater than $1 \times 10^{-1}$ Ωcm and in which the distance between nearest neighbor atoms is 0.25 nm to 0.32 nm; and
   a magnetic thin film formed on said electrically conductive underlayer, whose main component is iron nitride having perpendicular magnetic anisotropy, wherein the content of nitrogen in said magnetic thin film is 20 to 32 atom % and said magnetic thin film has a saturation magnetic flux density of 0.2 Wb/m$^2$ to 1.0 Wb/m$^2$.

6. A perpendicular magnetic recording medium according to claim 5, in which the distance between nearest neighbor atoms of said electrically conductive underlayer is not smaller than 0.265 nm and not greater than nm.

7. A perpendicular magnetic recording medium according to claim 5, in which said electrically conductive underlayer is made of at least one material selected from the group consisting of V, Ru, Zn, Os, Rh, Ir, Mo, W, Re, Pd, Pt, Nb, Ta, Sn, Al, Au, Ag, and electrically conductive nitrides and oxides thereof.

8. A perpendicular magnetic recording medium according to claim 5, in which said underlayer is made of at least one material selected from the group consisting of Zn, Mo, W, Nb, Ta, Al, Ti, Sn and oxides of Sn.

9. A perpendicular magnetic recording medium according to claim 5, in which the content of nitrogen in said magnetic thin film is not smaller than 22 atom % and not greater than 28 atom %.

10. A perpendicular magnetic recording medium according to claim 5, in which the saturation magnetic flux density of said magnetic thin film is not smaller than 0.65 Wb/m$^2$ and not greater than 1 Wb/m$^2$.

11. A perpendicular magnetic recording medium according to claim 5, in which the magnetic thin film further comprises at least one material selected from the group consisting of Cr, Ni, Co, Bi, elements of the platinum group, Zr, Ta, Nb, Al, and W at a content not greater than 10 atom % together with iron.

12. A perpendicular magnetic recording medium according to claim 5, in which the thickness of said magnetic thin film is not smaller than 0.1 μm and not greater than 1.0 μm.

13. A perpendicular magnetic recording medium according to claim 5, wherein said electrically conductive underlayer comprises at least two film layers.

14. A perpendicular magnetic recording medium according to claim 5, in which the thickness of said electrically conductive underlayer is not greater than 0.2 μm.

15. A perpendicular magnetic recording medium according to claim 14, in which the distance between nearest neighbor atoms of said electrically conductive underlayer is not smaller than 0.265 nm and not greater than 0.285 nm.

16. A perpendicular magnetic recording medium according to claim 14, in which said electrically conductive underlayer is made of at least one material selected from the group consisting of V, Ru, Zn, Os, Rh, Ir, Mo, W, Re, Pd, Pt, Nb, Ta, Sn, Al, Au, Ag, and electrically conductive nitrides and oxides thereof.

17. A perpendicular magnetic recording medium according to claim 14, in which said underlayer is made of at least one material selected from the group consisting of Zn, Mo, W, Nb, Ta, Al, Ti, Sn and oxides of Sn.

18. A perpendicular magnetic recording medium according to claim 14, in which the content of nitrogen in said magnetic thin film is not smaller than 22 atom % and not greater than 28 atom %.

19. A perpendicular magnetic recording medium according to claim 14, in which the saturation magnetic flux density of said magnetic thin film is not smaller than 0.65 Wb/m$^2$ and not greater than 1 Wb/m$^2$.

20. A perpendicular magnetic recording medium according to claim 14, in which the magnetic thin film further comprises at least one material selected from the group consisting of Cr, Ni, Co, Bi, elements of the platinum group, Zr, Ta, Nb, Al, and W at a content not greater than 10 atom % together with iron.

21. A perpendicular magnetic recording medium according to claim 14, in which the thickness of said magnetic thin film is not smaller than 0.1 μm and not greater than 1.0 μm.

22. A perpendicular magnetic recording medium comprising:
   a non-magnetic substrate;
   a high permeability magnetic film disposed on said non-magnetic substrate;
   at least an intermediate film formed on said high permeability magnetic film, said intermediate film having an electrical resistivity not greater than $1 \times 10^{-1}$ Ωcm and in which the distance between nearest neighbor atoms is 0.25 nm to 0.32 nm; and
   a magnetic thin film formed on said intermediate film, whose main component is iron nitride having a perpendicular magnetic anisotropy, wherein said magnetic thin film has a nitrogen content of 20 to 32 atom % and a saturation magnetic flux density of 0.2 Wb/m$^2$ to 1.0 Wb/m$^2$.

23. A perpendicular magnetic recording medium according to claim 22, in which said intermediate film is made of at least one material selected from the group consisting of V, Ru, Zn, Os, Rh, Ir, Mo, W, Re, Pd, Pt, Nb, Ta, Sn, Al, Au, Ag, and nitrides and oxides thereof.

24. A perpendicular magnetic recording medium according to claim 22, in which the thickness of said magnetic thin film is not smaller than 0.1 μm and not greater than 1.0 μm; the content of nitrogen in said magnetic thin film is not smaller than 22 atom % and not greater than 28 atom %; and said magnetic thin film is a perpendicularly magnetized film, whose main component is iron nitride having a saturation magnetic flux density not smaller than 0.65 Wb/m$^2$ and not greater than 1 Wb/m$^2$.

25. A perpendicular magnetic recording medium according to claim 22, in which the magnetic thin film further comprises at least one material selected from the group consisting of Cr, Ni, Co, Bi, elements of the platinum group, Zr, Ta, Nb, Al, and W at a content not greater than 10 atom % together with iron.

26. A perpendicular magnetic recording medium according to claim 22, wherein said intermediate film has a thickness of at least 0.01 μm.

27. A perpendicular magnetic recording medium according to claim 22, wherein said intermediate film has a thickness of 0.01 μm to 0.05 μm.

28. perpendicular magnetic recording medium according to claim 22, in which the distance between nearest neighbor atoms of said electrically conductive underlayer is not smaller than 0.265 nm and not greater than 0.285 nm.

29. A perpendicular magnetic recording medium according to claim 22, wherein said intermediate film comprises at least two layers.

30. A perpendicular magnetic recording medium according to claim 22, wherein total thickness of the intermediate film is not smaller than 0.01 μm and not greater than 0.1 μm.

31. A perpendicular magnetic recording medium according to claim 30, in which said intermediate film is made of at least one material selected from the group consisting of V, Ru, Zn, Os, Rh, Ir, Mo, W, Re, Pd, Pt, Nb, Ta, Sn, Al, Au, Ag, and nitrides and oxides thereof.

32. A perpendicular magnetic recording medium according to claim 30, in which the thickness of said magnetic thin film is not smaller than 0.1 μm and not greater than 1.0 μm; the content of nitrogen in said magnetic thin film is not smaller than 22 atom % and not greater than 28 atom %; and said magnetic thin film is a perpendicularly magnetized film, whose main component is iron nitride having a saturation magnetic flux density not smaller than 0.65 Wb/m$^2$ and not greater than 1 Wb/m$^2$.

33. A perpendicular magnetic recording medium according to claim 30, in which the magnetic thin film further comprises at least one material selected from the group consisting of Cr, Ni, Co, Bi, elements of the platinum group, Zr, Ta, Nb, Al, and W at a content not greater than 10 atom % together with iron.

* * * * *